United States Patent [19]

Mori

[11] Patent Number: 5,148,010
[45] Date of Patent: Sep. 15, 1992

[54] AUTOMATIC FOCUSING APPARATUS AND METHOD INCLUDES A PHOTOREFRACTIVE CRYSTAL HAVING A LENS EFFECT

[75] Inventor: Sadao Mori, Ibaraki, Japan

[73] Assignee: Hitachi, Ltd., Tokyo, Japan

[21] Appl. No.: 694,368

[22] Filed: May 1, 1991

[30] Foreign Application Priority Data

May 2, 1990 [JP] Japan .................. 2-115093

[51] Int. Cl.⁵ .............................................. G01J 1/20
[52] U.S. Cl. ................. 250/201.5; 369/44.23
[58] Field of Search ............ 250/201.5, 201.9; 369/44.12, 44.14, 44.23, 44.21; 359/714, 716

[56] References Cited

U.S. PATENT DOCUMENTS

| | | | |
|---|---|---|---|
| 5,005,927 | 4/1991 | Cudney et al. | 359/370 |
| 5,028,102 | 7/1991 | Ogura et al. | 359/559 |
| 5,084,850 | 1/1992 | Yanagawa et al. | 369/44.23 |

OTHER PUBLICATIONS

Optical Disk Technique; p. 124; Radio Technique Company; 1989.
Journal of Lightwave Technology; vol. LT-4; No. 7; Jul. 1986; pp. 913-915.
"BaTiO₃ and Phase-Conjugate (II)-Generation and Its Application"; Optics vol. 18; No. 3; pp. 146-147; Mar. 1988.
Quantum Electronics 3rd Edition; Amnon Yariv; pp. 495-529; John Wiley & Sons, Inc.
"An Integrated-Optic Disk Pickup Device"; Technical Report OQE85-72; The Institute of Electronics and Communication Engineer of Japan; pp. 39-46.
J. Opt. Soc. Am./vol. 72; No. 1; Jan. 1982; pp. 47-48.

*Primary Examiner*—David C. Nelms
*Assistant Examiner*—Que T. Le
*Attorney, Agent, or Firm*—Antonelli, Terry, Stout & Kraus

[57] ABSTRACT

There are disclosed an automatic focusing apparatus and an automatic focusing method for an optical disk apparatus. The present automatic focusing apparatus comprises a light source for outputting an optical beam to be focused; a focusing optical system for focusing the optical beam to be focused onto a desired position by using a photorefractive crystal having a lens effect; a device for forming a refractive-index distribution forming beam having a predetermined intensity distribution and outputting the beam onto the photorefractive crystal to generate a lens effect in the photorefractive crystal; a control beam outputting device for outputting a control beam onto the photorefractive crystal to control the lens effect caused by the refractive-index distribution generated in the photorefractive crystal; and a device for controlling the control beam outputting device. Focus adjustment is thus made without moving the lens.

24 Claims, 6 Drawing Sheets

ABNORMAL RAY INTENSITY DISTRIBUTION $I_{(r)} = I_0 \exp(-2(\frac{r}{r_0})^2)$ $r_0 =$ CONST.

FIG. 2B

TRANSMISSION PATTERN

$T \doteq \frac{\Delta n}{n_0 n_e^2 r_{42}} \int_{r_\epsilon}^{r} \frac{1-(\frac{r}{r_1})^2}{\theta_{(r)}} dr \Big/ (I_0 \exp(-2(\frac{r}{r_0})^2))$ FOR $r \geq r_\epsilon$ ($T=0$ FOR $0 \leq r \leq r_\epsilon$)

FIG. 2C

TRANSMITTED RAY INTENSITY DISTRIBUTION $I_{(r)} \doteq \frac{\Delta n}{n_0 n_e^2 r_{42}} \int_{r_\epsilon}^{r} \frac{1-(\frac{r}{r_1})^2}{\theta_{(r)}} dr$

FIG. 2D

REFRACTIVE INDEX CHANGE $\Delta n_{EXT} = \Delta n_{max}(1-(\frac{r}{r_1})^2)$   $r \geq r_\epsilon$

AUTOMATIC FOCUSING APPARATUS AND METHOD INCLUDES A PHOTOREFRACTIVE CRYSTAL HAVING A LENS EFFECT

BACKGROUND OF THE INVENTION

The present invention relates to an automatic focusing apparatus, and method, and in particular to an automatic focusing apparatus, and method, simplifying the configuration of an automatic focusing mechanism and a tracking mechanism in an optical disk apparatus.

As the automatic focusing mechanism and tracking mechanism in a conventional optical disk apparatus, a scheme is presented in "Optical Disk Technique", p. 124 published by the Radio Technique Company, 1989, for example. In this scheme, a voice coil motor or the like moves a lens facing an optical disk vertically or horizontally with respect to the disk to move the position of the optical spot in the focusing direction and the tracking direction.

In the above described prior art, the automatic focusing mechanism moves the lens in a direction perpendicular to the optical disk to adjust the optical spot focusing and the tracking mechanism moves that lens in the horizontal direction to adjust the optical spot position. The above described prior art has a problem that the automatic focusing mechanism and tracking mechanism become complicated and large-sized because a lens having a large inertial mass is mechanically moved.

SUMMARY OF THE INVENTION

An object of the present invention is to provide an automatic focusing apparatus, and method, making possible focusing and/or tracking without moving a lens.

Another object of the present invention is to make adjustment of focusing position possible and make mechanisms of an automatic focusing apparatus small-sized by moving a transmission pattern which is smaller in inertial mass than the lens.

In order to achieve the above described object, an automatic focusing apparatus of the present invention comprises: a light source for outputting an optical beam to be focused; a focusing optical system for focusing an optical beam to be focused onto a focusing position by using a photorefractive crystal having a lens effect; a refractive-index distribution forming beam forming means for forming a refractive-index distribution forming beam having a predetermined intensity distribution and outputting the beam onto the above described photorefractive crystal to generate a lens effect in the above described photorefractive crystal; control beam outputting means for outputting a control beam onto the above described photorefractive crystal to control the lens effect caused by the refractive-index distribution generated in the above described photorefractive crystal; and means for controlling the above described control beam outputting means.

Further, an automatic focusing apparatus of the present invention comprises: a light source of a beam to be focused for outputting a linearly polarized coherent beam; polarization means for converting the linearly polarized beam outputted from the light source to a circularly polarized beam; means for separating an extraordinary ray and an ordinary ray from the above described circularly polarized beam and passing only the extraordinary beam; a transmission device for transmitting a beam so as to provide a predetermined intensity distribution; a focusing optical system for focusing the separated extraordinary ray onto a focusing position by using a focusing photorefractive crystal having a lens effect, the above described photorefractive crystal producing a lens effect caused by a refractive-index distribution according to the intensity distribution of an inputted beam to be focused and focusing the beam to be focused on the basis of the above described refractive index; control beam outputting means including means for adjusting the intensity of an outputted beam, the above described control beam outputting means adjusting a control beam for controlling the lens effect caused by the refractive-index distribution generated in the above described photorefractive crystal by using the above described intensity adjusting means, the above described control beam outputting means outputting the control beam to the above described photorefractive crystal; and control means including beam receiving means for receiving the focused beam reflected from the above described focusing position and detection means for detecting the deviation of the focused beam, the above described control means receiving the focused beam reflected from the above described focusing position by using the above described beam receiving means, detecting focusing deviation of the focused beam by using the above described detection means, supplying a control signal for controlling the focusing of the focused beam to the above described beam intensity adjusting means on the basis of the detected deviation, and controlling the above described control beam outputting means.

Further, an automatic focusing apparatus of the present invention comprises: a light source of a beam to be focused for outputting a linearly polarized coherent beam; polarization means for converting the linearly polarized beam outputted from the light source to a circularly polarized beam; means for separating an extraordinary ray and an ordinary ray from the above described circularly polarized beam and passing only the extraordinary ray; a focusing optical system for focusing the separated extraordinary ray onto a focusing position by using a photorefractive crystal having a lens effect; means for forming a refractive-index distribution forming beam, the above described refractive-index distribution forming beam forming means including a transmission device for transmitting a beam so as to provide a predetermined intensity distribution, the above described refractive-index distribution forming beam forming means causing the above-described transmission device to transmit a beam and form a refractive-index distribution forming beam having a predetermined intensity distribution and outputting the above described refractive-index distribution forming beam onto the above described photorefractive crystal to cause a lens effect in the above described photorefractive crystal; control beam outputting means including means for adjusting the intensity of an outputted beam, the above described control beam outputting means adjusting a control beam for controlling the lens effect caused by the refractive-index distribution generated in the above described photorefractive crystal by using the above described beam intensity adjusting means, the above described control beam outputting means outputting the control beam to the above described photorefractive crystal; and control means including beam receiving means for receiving the focused beam reflected from the above described focusing position and detection means for detecting the deviation of the focused beam, the above described control means receiving the focused beam reflected from the above described focusing position by using the above described beam receiving means, detecting focusing deviation of the focused beam by using the above described detection means, supplying a control signal for controlling the focusing of the focused beam to the above described beam intensity adjusting means on the basis of the detected deviation, and controlling the above described control beam outputting means.

Further, an automatic focusing apparatus of the present invention comprises: a polarizing beam splitter; a grated index lens; a photorefractive crystal; first and second semiconductor laser light sources provided on the same optical axis respectively above and below the above described polarizing beam splitter; an optical integrated circuit for detecting the deviation of focus position in the focusing direction and tracking direction on the basis of the reflected beam from the focused position in a direction perpendicular to the above described optical axis; a spacer and a quarter wave plate provided around the above described second semiconductor laser light source and between the above described polarizing beam splitter and the above described grated index lens; and a minute screening means so disposed on the upper face of the above described photorefractive crystal as to face the above described focused position.

An automatic focusing method of the present invention comprises the steps of: outputting a beam to be focused from a light source; focusing the beam to be focused onto a focusing position by using a photorefractive crystal having a lens effect; outputting a refractive-index distribution forming beam having a predetermined intensity distribution to the above described photorefractive crystal and generating a lens effect in the above described photorefractive crystal; outputting a control beam onto the above described photorefractive crystal to control the lens effect caused by the refractive-index distribution generated in the above described photorefractive crystal; and controlling the intensity of the above described control beam and adjusting the focusing position of the beam to be focused.

Further, an automatic focusing method of the present invention comprises the steps of: outputting a linearly polarized coherent beam from a light source for a beam to be focused; converting the linearly polarized beam outputted from the light source to a circularly polarized beam; separating an extraordinary ray and an ordinary ray from the above described circularly polarized beam and passing only the extraordinary ray; focusing the separated extraordinary ray onto a focusing position by using a photorefractive crystal having a lens effect; causing a transmission device for providing a predetermined intensity distribution to transmit a beam, thereby forming a refractive-index distribution forming beam having a predetermined intensity distribution, outputting the above described refractive-index distribution forming beam to the above-described photorefractive crystal, and generating the lens effect in the above described photorefractive crystal; adjusting a control beam for controlling the lens effect caused by the refractive-index distribution generated in the above described photorefractive crystal by using a device for adjusting the intensity of a beam to be outputted and outputting the control beam thus adjusted to the above described photorefractive crystal; and receiving the focused beam reflected from the above described focusing position, detecting focusing deviation of the focused beam, supplying a control signal to the above described beam intensity adjusting means so as to control the focusing of the focused beam on the basis of the detected deviation, and thereby controlling the intensity of the above described control bean:.

An automatic focusing apparatus of the present invention adjusts the position of the focal point by using a photorefractive crystal exhibiting a photorefractive effect, which means such a phenomenon that a spatial charge distribution induced by radiation of light brings about a change in refractive index by means of the Pockels effect. In order to generate a lens effect in the above described photorefractive crystal, a refractive-index distribution forming beam having an intensity distribution is outputted. And a control beam for controlling the lens effect caused by the refractive-index distribution generated in the above described photorefractive crystal is outputted to the above described photorefractive crystal. As for the above described photorefractive crystal, refer to "BaTi-$O_3$ and Phase-Conjugate (II)-Generation and Its Applications", Optics Vol. 18, No. 3, p. 146 (March 1988) or Quantum Electronics 3rd Edition pp. 495–529 by Amnon Yariv, John Wiley & Sons Inc.

The present invention provides the above described photorefractive crystal with lens function by radiating a beam having a suitable intensity pattern onto a photoreactive crystal having a refractive index which changes with the intensity of the radiated beam. The present invention thus makes it possible to move the lens focusing position by changing the intensity and position of the radiation without moving the position of the above described photorefractive crystal or the lens.

BRIEF DESCRIPTION OF THE DRAWINGS

These and other objects and advantages of the present invention will become apparent by reference to the following description and accompanying drawings wherein:

FIGS. 2A, 2B, 2C and 2D are diagrams illustrating the operation of the apparatus of FIG. 1, FIG. 2A shows an extraordinary ray distribution, FIG. 2B shows the transmission pattern of an embodiment, FIG. 2C shows the intensity distribution of an extraordinary ray of FIG. 2A transmitted through the transmission pattern of FIG. 2B, and FIG. 2D shows a change of refractive index caused in the photorefractive crystal;

DESCRIPTION OF THE PREFERRED EMBODIMENTS

FIGS. 1 and 2A to 2D showing an embodiment of the present invention will hereafter be described.

Figure 1:
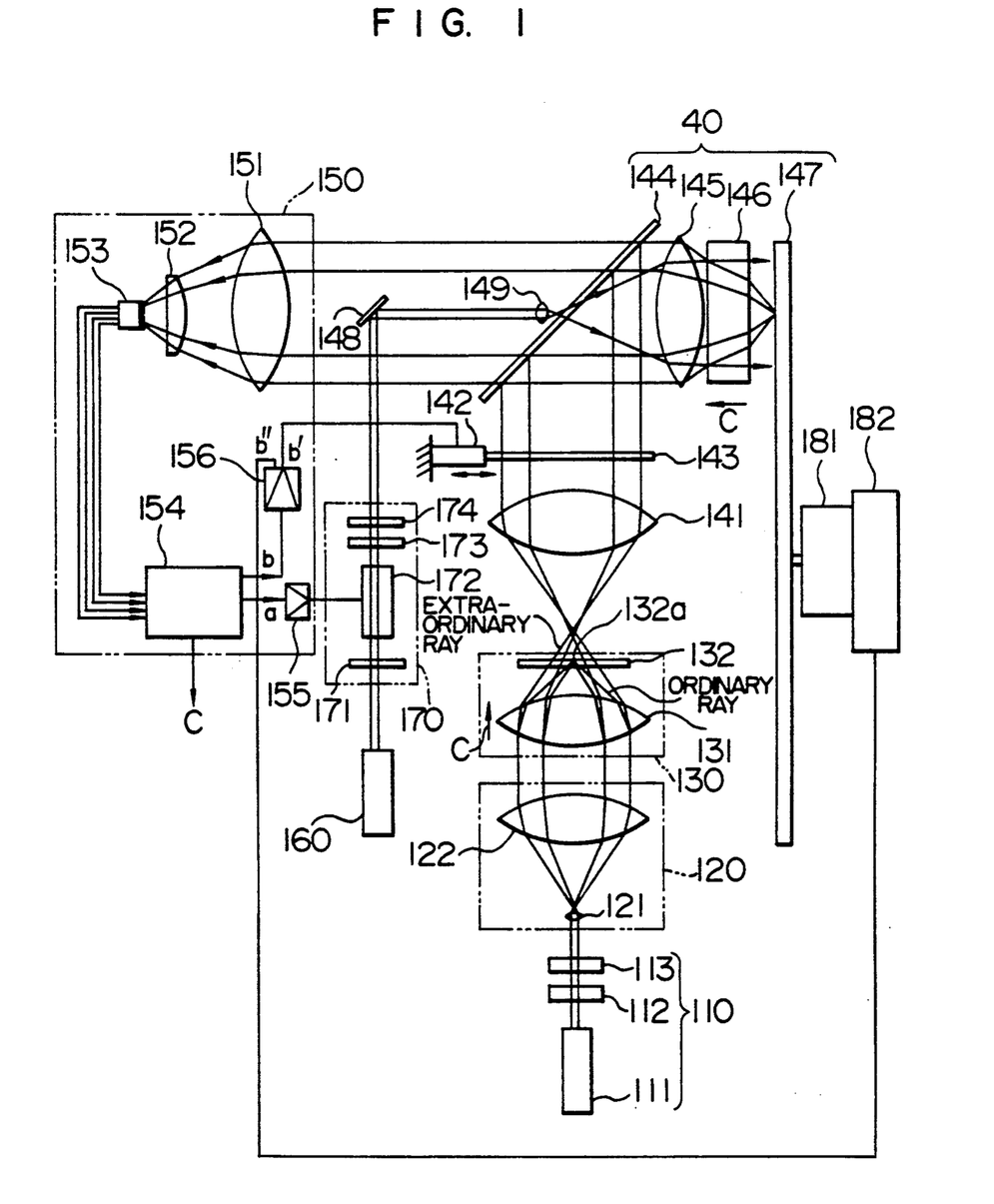
FIG. 1 is a configuration diagram of an optical disk apparatus using an automatic focusing apparatus which is an embodiment of the present invention.

FIG. 1 shows the configuration of an optical disk apparatus having an automatic focusing apparatus according to an embodiment of the present invention. With reference to FIG. 1, numeral 110 denotes first laser oscillation means comprising a laser oscillator 111 for outputting a linearly polarized coherent beam, a polarizing plate 112, and a quarter wave plate 113 for converting a linearly polarized beam to a circularly polarized beam. Numeral 120 denotes a beam expander, which comprises lenses 121 and 122. Numeral 130 denotes radial polarization selecting means for extracting only an extraordinary ray component out of inputted rays. The radial polarization selecting means 130 comprises a spherical lens 131 formed by a uniaxial crystal comprising calcite, for example, and a screening plate 132 having a minute screening portion 132a at the central parts thereof. The above described spherical lens 131 has an optical axis coinciding with the C axis which is a crystal axis of the uniaxial crystal. Numeral 140 denotes an optical system comprising an aspheric lens 141, a plate 143 having a transmission pattern formed thereon, a half mirror 144, a focusing lens 145, a photorefractive crystal 146, an optical disk 147, a mirror 148, and a lens 149. Among them, the focusing lens 145 and the photorefractive crystal 146 form a focusing optical system. The above described aspheric lens 141 is so formed as to have a shorter focal length at the outer portion as compared with the central portion. The aspheric lens 141 converts a beam outputted from the above described radial polarization selecting means 130 into a parallel beam. The above described transmission pattern plate 143 is so formed as to be axisymmetric as shown in FIG. 2B. An actuator 142 forming a tracking mechanism moves the transmission pattern in a direction indicated by arrows. The above described photorefractive crystal 146 comprises barium titanate, for example. The input optical axis is adapted to coincide with the above described C axis. Numeral 150 denotes a focus deviation detecting system, comprising a lens 151, a cylindrical lens 152, a quadrant detector 153, a computing circuit 154, an amplifier 155 connected to an electro-optic crystal 172 of an EO (electro-optic) modulator 170 forming an optical intensity modulator which will be described later, and an amplifier 156 connected to the above described actuator 142.

For brevity, the axis of the cylindrical lens 152 is shown in FIG. 1 to agree with the axis of the lens 151. In reality, however, the cylindrical lens is inclined by 45° with respect to the paper plane.

On the basis of a beam reflected by the optical disk 147 and received by the above described quadrant detector 153, the above described computing circuit 154 detects deviations of the focus position (focusing deviation and tracking deviation) and outputs a focusing signal a and a tracking signal b. In addition, the computing circuit 154 reads information of the optical disk from the above described reflected beam and outputs a readout signal c.

Figure 7:
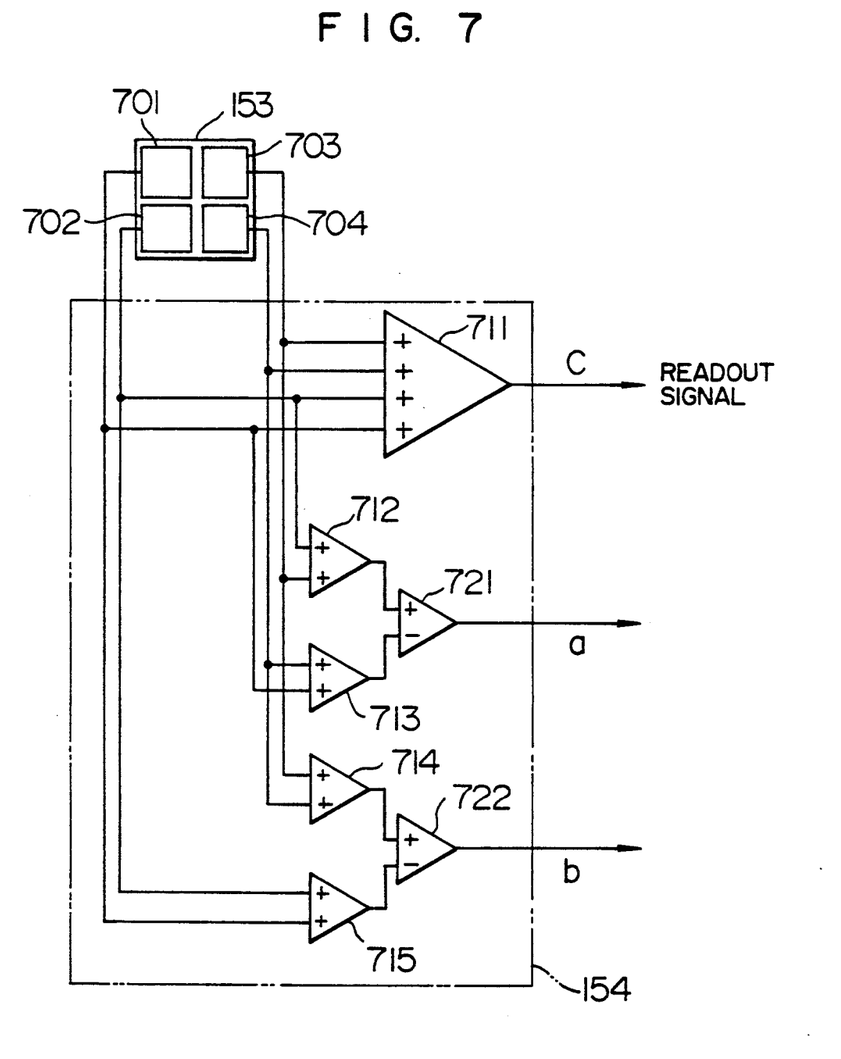
FIG. 7 is a block diagram of a computing circuit which is an embodiment, of the present invention.

The block diagram of the above described computing circuit 154 is shown in FIG. 7. The computing circuit comprises adders 711 to 715 supplied with outputs of light receiving faces 701, 702, 703 and 704 of the quadrant detector 153, and subtracters 721 and 722 supplied with outputs of the above described adders 712 to 715. The output of the adder 711 is outputted as the readout signal c. Outputs of the subtracters 721 and 722 are outputted as the tracking signal b and the focusing signal a, respectively.

Returning to FIG. 1, numeral 170 denotes an EO modulator forming a focusing mechanism for adjusting the focal point. The EO modulator 170 comprises a polarizing plate 171, an electro-optic crystal 172, a polarizing plate 173, and a quarter wave plate 174. In response to the focusing signal a supplied from the above described amplifier 155, the above described electro-optic crystal 172 changes the angle of refraction of an electric field applied from a second laser oscillator 160. The above described quarter wave plate 174 is so disposed that its fast axis (slow axis) may be inclined by 45° with respect to the transmission axis of the above described polarizing plate 173. The quarter wave plate 174 converts a beam transmitted through the above described polarizing plate 173 into a circularly polarized beam.

Operation will now be described.

In the first laser oscillation means 110, a beam supplied from the laser oscillator 111 is converted into a circularly polarized beam by the polarizing plate 112 and the quarter wave plate 113, and is then expanded by the beam expander 120. The linearly polarized beam outputted from the laser oscillator 111 is converted into the circularly polarized beam with the object of making the intensity distribution of the beam outputted from the radial polarization selecting means 130 symmetric with respect to the optical axis. The optical beam expanded by the beam expander 120 is focused by a spherical lens 131 of the radial polarization selecting means 130. Since the spherical lens comprises calcite and is anisotropic, the ray inputted to the spherical lens 131 is divided into an ordinary ray and an extraordinary ray at this time by birefringence. The normal ray is focused to one point irrespective of the input position (deviation from the optical axis), whereas the extraordinary ray is focused onto a different position depending upon the input position.

That is to say, calcite forming the above described spherical lens 131 has a refractive index $n_e$ for an extraordinary ray which is smaller than a refractive index $n_o$ for an ordinary ray. In case of the extraordinary ray, therefore, an outer ray is focused at a remote distance. The above described radial polarization selecting means 130 comprises the screening plate 132 having the minute screening portion 132a for screening the focusing position of the above described ordinary ray. Therefore, it is possible to extract only an extraordinary ray component which is axisymmetric with respect to the optical axis and which vibrates radially. The extraordinary ray thus extracted by the above described radial polarization selecting means 130 is converted into a parallel beam by the aspheric lens 141. In this case, the accurate shape of the above described aspheric lens 141 can be derived by performing ray trace with respect to the extraordinary ray transmitted through the above described aspheric lens 141 and the above described spherical lens 131.

The reason why only the extraordinary ray component is extracted from the beam is that the refractive index of a photorefractive crystal largely changes for an extraordinary ray as described later.

Figure 2A:
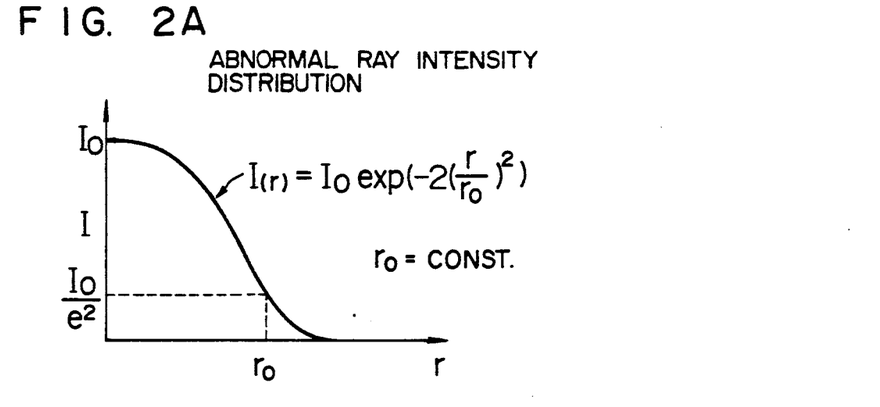
Figure 2B:
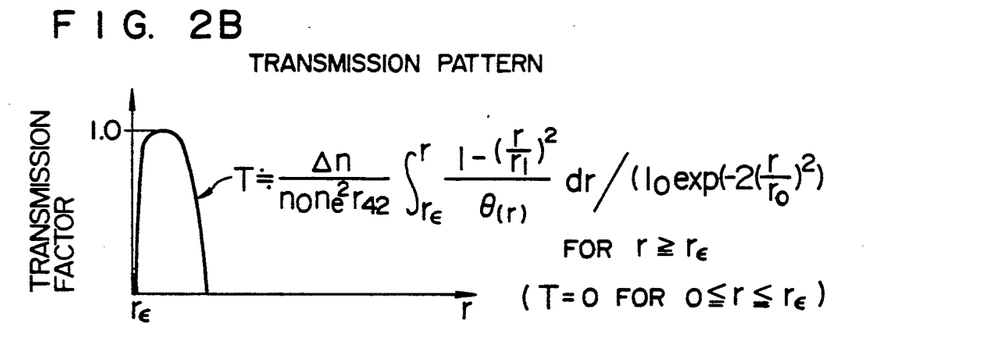

The extraordinary ray converted into a parallel ray is represented as a function of distance r(70) from the optical axis by the following expression and has a intensity distribution of Gaussian beam as shown in FIG. 2A.

$$I(r) = I_o \exp\left(-2\left(\frac{r}{r_o}\right)^2\right) \quad (A)$$

Here
I = intensity of extraordinary ray
$I_o$ = intensity of extraordinary ray at the optical axis
r = distance from optical axis
$r_o$ = beam radius of extraordinary ray (position of r satisfying $I = I_o/e^2$)

Figure 3:
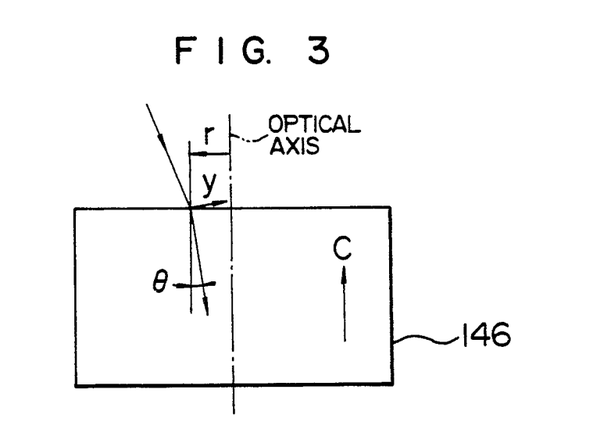
FIG. 3 is a diagram showing the state obtained when an extraordinary ray is inputted to a photorefractive crystal.

This beam is passed through the transmission pattern plate 143 having a transmission pattern formed axisymmetrically as shown in FIG. 2B to provide the above described beam with a predetermined intensity distribution. In case barium titanate is used as the photorefractive crystal, for example, it is possible to provide the transmission pattern 143 with a transmission factor expressed by $$T \approx \frac{\Delta n}{n_o n_e^2 r_{42}} \int_{r_\epsilon}^{r} \frac{1 - \left(\frac{r}{r_1}\right)^2}{\theta(r)} dr / \left(I_o \exp\left(-2\left(\frac{r}{r_o}\right)^2\right)\right) \quad (B)$$

for $r \geq r_\epsilon$ (T = 0 for $0 \leq r \leq r_\epsilon$)

where
$r_1$ = positive constant
$r_\epsilon$ = positive constant (small) i.e., such a small constant that no influence is exerted even if this portion is missing
$\Delta n$ = positive constant
$r_{42}$ = Pockels constant
$\theta(r) = \theta$ is a function of r, refer to FIG. 3 which will be described later for $\theta$.

Figure 2C:
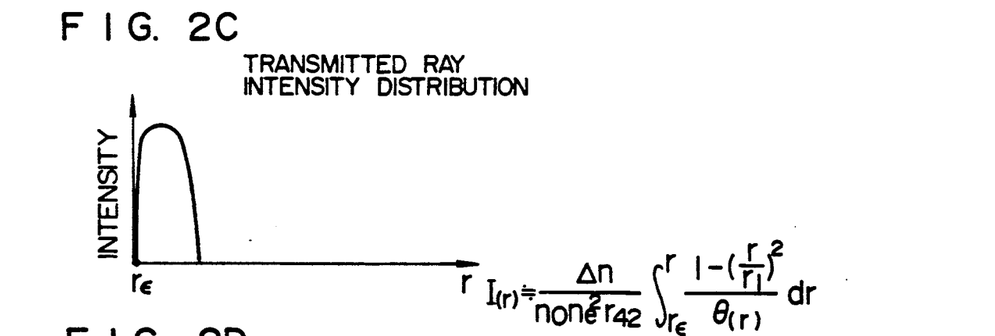

The transmitted beam obtained by passing the Gaussian beam having the intensity distribution of the expression (A) through the transmission pattern 143 having the transmission factor of the expression (B) has an intensity distribution as shown in FIG. 2C and is represented by the following equation.

$$T(r) = \frac{\Delta n}{n_o n_e^2 r_{42}} \int_{r_\epsilon}^{r} \frac{1 - \left(\frac{r}{r_1}\right)^2}{\theta(r)} dr \quad (C)$$

That is to say, assuming that the incidence position upon the photorefractive crystal is r and the incidence angle is $\theta(r)$, a beam having the intensity distribution represented by this equation is inputted to the photorefractive crystal.

The parallel beam provided with such an intensity distribution is converted in the direction of the focusing lens 145 by the half mirror 144. The shape of the focusing is set beforehand by using the technique of ray trace so that extraordinary rays may be focused at one point when the focusing lens 145 is combined with the photorefractive crystal 146. (If the input beam has an intensity distribution at this time, the refractive index of barium titanate for an extraordinary ray changes as described later. Therefore, the shape of the focusing lens 145 is set on the assumption that the input beam has no intensity distribution.) When the extraordinary ray passed through the focusing lens 145 is inputted to the photorefractive crystal 146, the refractive index for the extraordinary ray in a position located at a distance r from the optical axis changed by a quantity $\Delta n_{EXT}(x)$ indicated by the following expression because of a photorefractive effect of the photorefractive crystal 146, which means such a phenomenon that a spatial charge distribution induced by beam radiation brings about a change in refractive index by the Pockel effect. (Refer to "Optics", Vol. 18, No. 3, pp. 146–147, March 1989 and J. Opt, Soc, Am, Vol. 72, No. 1, pp. 47–48, January 1982.)

$$\Delta n_{EXT}(x) = -[\vec{E}(x) \cdot \vec{y}] \frac{\sin\theta}{2n(\theta)} (n_o^4 r_{13} \cos^2\theta + \quad (1)$$

$$2n_o^2 n_e^2 r_{42} \cos^2\theta + n_e^4 r_{33} \sin^2\theta)$$

In the above expression, $n(\theta) = (n_e^2 \sin^2\theta + n_o^2 \cos^2\theta)^{-\frac{1}{2}}$, $n_e$ is a refractive index for extraordinary ray, $n_o$ a refractive index for ordinary ray, $r_{13}$, $r_{42}$ and $r_{33}$ Pockels constants, $\vec{E}(x)$ an electric field in a position x, $\vec{y}$ a unit vector in a direction perpendicular to the ray, and $\theta$ an angle formed by the travelling direction of the ray and the C axis. (Refer to FIG. 3.)

Here, the electric field distribution ($\vec{E}(\vec{x})$) is given by ($\partial I/\partial y$) which is differential of intensity $I(\vec{x})$ with respect to a direction $\vec{y}$ perpendicular to the travelling direction of the beam.

A change in refractive index caused when the light intensity distribution given by FIG. 2C is inputted to the photorefractive crystal 146 will now be described.

Since the refractive index of barium titanate forming the photorefractive crystal 146 is as large as $n_e$, $n_o \approx 2.4$, the above described $\theta$ becomes $\theta = 17°$ in this case even for a beam inputted with an incidence angle of 45°. Thus, the above described $\theta$ does not become so large.

$$r_{42} = 1700 \times 10^{-12} m/v >> r_{33} = 28 \times 10^{-12} m/v$$

$$r_{42} >> r_{13} = 8 \times 10^{-12} m/v$$

Considering these two conditions, the above described expression (1) can be approximated by the following expression (2).

$$\Delta n_{EXT}(x) = -[\vec{E}(\vec{x}) \vec{y}] \cdot \theta \cdot n_o \cdot n_e^2 \cdot r_{42} \quad (2)$$

Figure 2D:
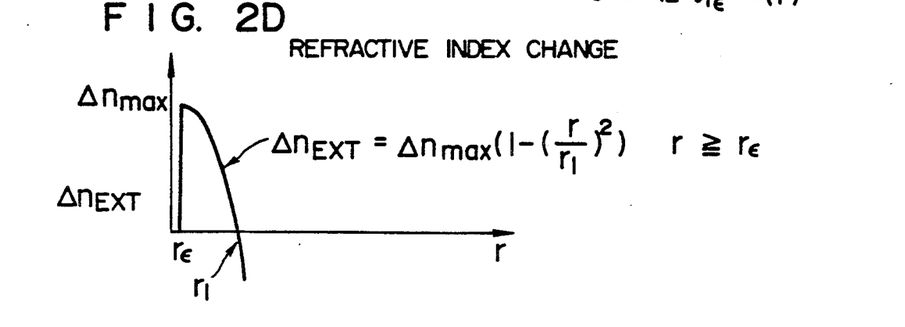

If the above described $\vec{E}(\vec{x})$ is derived from the slope of FIG. 2C, the refractive index changes in a parabolic form as shown in FIG. 2D. This can be represented as $$\Delta n_{EXT} = \Delta \max\left(1 - \left(\frac{r}{r_1}\right)^2\right)$$

where $r \geq r_\epsilon$. Therefore, input beams are concentrated in the optical axis direction.

In the above described photorefractive crystal 146, however, the refractive index changes as a result of intensity distribution of transmitted ray as shown in FIG. 2C. The focusing position on the optical disk 147 may thus deviate.

Therefore, it is attempted to adjust (control) the focusing position by using the output beam from the second laser oscillator 160. That is to say, a beam outputted from the second laser oscillator 160 to the EO modulator 170 is passed through the polarizing plate 171, the electro-optic crystal 172, the polarizing plate 173 and the quarter wave plate 174 of the EO modulator 170 and is outputted to the mirror 148. The beam thus outputted to the mirror 148 is inputted to the above described photorefractive crystal via the lens 149. Since the above described input beam does not pass through the transmission pattern plate 143, its intensity distribution is relatively uniform. Therefore, the above described input beam acts to eliminate the refractive-index distribution produced by the radial polarized rays described before. Thereby, the position of radial polarized rays focused from the above described photorefractive crystal 146 onto the optical disk 147 is controlled.

For the reason that the position of the optical system 140 with respect to the optical disk 147 is deviated, for example, however, the focusing position of the radially polarized beam controlled as described above may not be located in a predetermined position on the optical disk 147.

In that case, the beam reflected by the optical disk 147 is led, in the present embodiment, to the focus position deviation detecting system 150 via the half mirror 144 and inputted to the computing circuit 154 via the lens 151, the cylindrical lens 152 and the quadrant detector 153 of the above described detecting system. As described before with reference to FIG. 7, the deviation of the focusing position on the above described optical disk 147 in the focusing direction and the tracking direction is detected in the above described computing circuit. And the focusing signal a and the tracking signal b are outputted to the electro-optic crystal 172 of the EO modulator 170 and the actuator 142 of the optical system 140 via the amplifiers 155 and 156, respectively.

On the basis of the focusing signal a, the electro-optic crystal 172 changes the phase difference between the component of the beam inputted from the second laser oscillator 160 which vibrates in a direction perpendicular to the paper plane and the component thereof which vibrates in a direction parallel to the paper plane. Thereby the EO modulator 170 adjusts the intensity of the beam inputted from the above described laser oscillator. A beam outputted from the EO modulator 170 is inputted to the photorefractive crystal 146, and the angle of refraction of the radially polarized beam inputted to the photorefractive crystal 146 is controlled. As a result, the focusing position on the optical disk 147 is moved in the focusing direction. Further, on the basis of a tracking signal b', the actuator 142 moves the transmission pattern plate 143 in the direction indicated by arrows to move the intensity distribution generated in the photorefractive crystal 146 in a parallel direction. Therefore, the focusing position of the optical disk 147 moves in the tracking direction (i.e., the vertical direction of FIG. 1).

Without moving the lens, therefore, it is possible to adjust the focusing position on the optical disk by controlling the angle of refraction of the radially polarized beam in the photorefractive crystal and by moving the intensity distribution generated in the crystal in the parallel direction.

Information readout from an optical disk apparatus using the focusing apparatus of the present embodiment will now be described.

On the disk 147 which is a recording medium, information is recorded in the circumferential direction as spots. The disk 147 is rotated by a drive device 181 and is moved in the tracking direction (vertical direction of FIG. 1) by a tracking adjusting mechanism 182. The beam to be focused supplied from the first laser oscillation means 110 is radiated onto a spot on the disk 147 by a focusing optical system (a spheric lens 145 and a photorefractive crystal 146) of the optical system 140. A reflected beam (signal read out) from the above described spot is incident upon the focus deviation detecting system 150 and is inputted to the quadrant detector 153. It is then computed in the computing circuit 154 and the result is outputted as the readout signal c.

On the other hand, the computing circuit 154 detects deviations in focusing and tracking from the reflected beam as described above and outputs the deviations as the focusing signal a and the tracking signal b, respectively. In response to the focusing signal a, the amplifier 155 adjusts the intensity of the beam outputted from the EO modulator 170 and thereby adjusts the radiation position of the beam to be focused in the focusing direction. Further, the tracking signal b inputted to the amplifier 156, which makes adjustment in the tracking direction. At this time, the amplifier 156 moves the optical disk for coarse adjustment of tracking by supplying output b'' to the above described tracking adjusting mechanism 182. For fine adjustment, the amplifier 156 moves the transmission pattern plate 143 by supplying the output b' to the actuator 142. The amplifier 156 thus makes adjustment.

Figure 4:
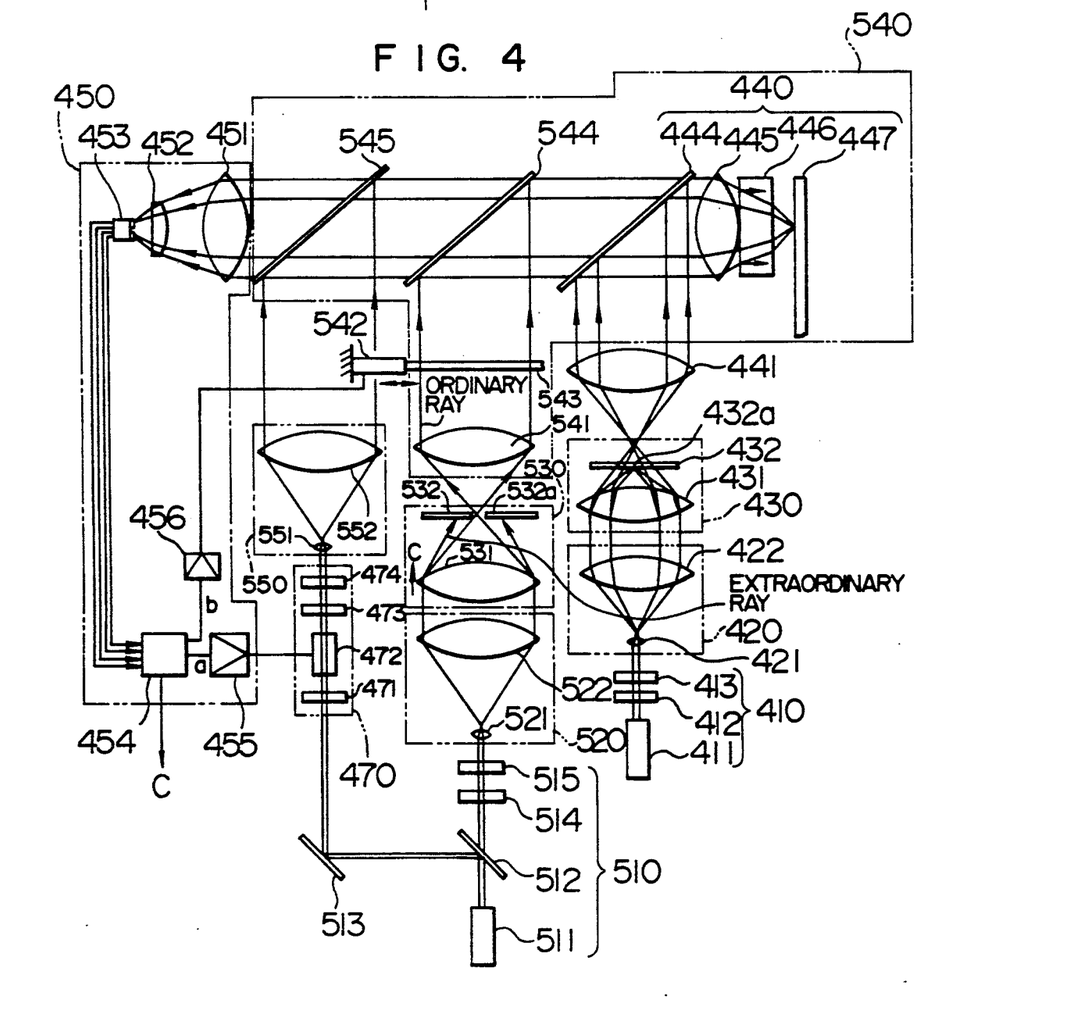
FIG. 4 is a configuration diagram of an automatic focusing apparatus showing another embodiment of the present invention.

Further, an automatic focusing apparatus according to another embodiment of the present invention will now be described by referring to FIG. 4. In the embodiment of FIG. 1, the role of refractive-index distribution former is allotted to the focused beam (radially polarized beam) itself in order to simplify the configuration. In the embodiment of FIG. 4, however, a mechanism outputting a refractive-index distribution forming beam for forming a desired refractive-index distribution in a crystal is provided separately from the focused beam in order to enhance the degree of design freedom.

In FIG. 4, nearly the same components as those of the apparatus of the embodiment of FIG. 1 are denoted by like characters and will not be further described.

With reference to FIG. 4, numeral 510 denotes third laser oscillation means, which comprises a third laser oscillator 511 for outputting a beam having a wavelength different from that of a first laser oscillator 411, a half mirror 512, a mirror 513, a polarizing plate 514 and a quarter wave plate 515. The above described half mirror 512 outputs a beam, which is outputted from the third laser oscillator 511, to the above described polarizing plate 514. In addition, the half mirror 512 changes the direction of the output beam of the third laser oscillator 511 and outputs it to the EO modulator 470 via the mirror 513. Numeral 520 denotes a second beam expander which comprises lenses 521 and 522. Numeral 530 denotes second radial polarization selecting means comprises a spherical lens 531 formed by a uniaxial crystal including calcite, for example, and a pinhole plate 533. The pinhole plate 532 has a pinhole 532a, which passes the ordinary ray supplied from the spherical lens 531, at its central part and screens the extraordinary ray located at its outer part. Numeral 540 denotes an optical system comprising an aspheric lens 541, a transmission pattern plate 543, a three half mirrors 444, 544 and 545 disposed on the same axis, a focusing lens 445 which is nearly the same as the focusing lens of the embodiment shown in FIG. 1, a photorefractive crystal 446, and an optical disk 447. Among the above described three half mirrors, the first half mirror 444 reflects a beam outputted from an aspheric lens 441, the second half mirror 544 reflects a beam outputted from the above described transmission pattern 543, and the third half mirror 545 reflects a beam outputted from a third beam expander 550 which will be described later. Each of beams thus reflected by three half mirrors are outputted to the photorefractive crystal 446. The above described transmission pattern plate 543 is moved in a direction indicated by arrows by an actuator 542 included in the tracking mechanism. The transmission pattern plate has nearly the same characteristics as those of the transmission pattern plate 143 described before with reference to FIG. 1. The above described third beam expander 550 has the same configuration as that of the beam expander of the embodiment shown in FIG. 1. In the third beam expander 550, the beam outputted from the EO modulator 470 included in the focusing mechanism is expanded by two lenses 551 and 552, and is outputted to the above described half mirror 545.

The operation will now be described. The beam supplied from the laser oscillator 411 is divided into an ordinary ray and an extraordinary ray by a spherical lens 431. Only the extraordinary ray is extracted by a screening plate 432 and converted into a parallel beam by the aspheric lens 441. Unlike the embodiment of FIG. 1, in order to prevent the parallel lay (beam to be focused) from passing through the transmission pattern 543 in the present embodiment, the parallel lay (beam to be focused) is inputted to the photorefractive crystal 446 via the half mirror 444 and the focusing lens 445 in the state of Gaussian beam having a relatively uniform intensity distribution. The extraordinary ray is then refracted by the photorefractive crystal 446 and is focused onto the optical disk 447.

On the other hand, the beam supplied from the third laser oscillator 511 of the third laser oscillation means 510 is divided into an ordinary ray and an extraordinary ray by the spherical lens 531. Only the extraordinary ray is extracted by the pinhole plate 532 and converted into a parallel ray by the aspheric lens 541.

When this parallel beam then passes through the transmission pattern plate 543, the parallel beam is provided with the intensity distribution of the Gaussian beam shown in FIG. 2C described before and is inputted to the photorefractive crystal 446 via the half mirror 544 and the focusing lens 445. Since this parallel beam has the intensity distribution shown in FIG. 2C, the parallel beam generates a parabolic refractive-index distribution in the photorefractive crystal 446 to control the refractive index for the above described extraordinary ray (focused beam outputted from the first laser oscillator 411).

Further, a beam which does not pass through the transmission pattern and which has a relatively uniform intensity distribution is inputted from the EO modulator 470 to the photorefractive crystal 446 to act so as to eliminate the refractive-index distribution formed in the photorefractive crystal by the parallel beam passed through the above described transmission pattern plate 543. The focusing position of the extraordinary ray to be focused on the optical disk 447 by the above described photorefractive crystal 446 is thus controlled.

Further, the reflected beam supplied from the optical disk 447 is led to a focus position deviation detecting system 450 via half mirrors 444, 544 and 545. The reflected beam is thus supplied to a computing circuit 454 via a lens 451, a cylindrical lens 452 (disposed in nearly the same position as the cylindrical lens 152 of FIG. 1), and a quadrant detector 453. On the basis of the output of the quadrant detector 453, the deviation of the focusing position on the above described optical disk 447 in the focusing direction and the tracking direction is detected. When a position deviation is generated, the focusing signal a and the tracking signal b corresponding to the direction of the position deviation are outputted to an electro-optic crystal 472 of the EO modulator 470 and an actuator 542 of the optical system 540 via amplifiers 455 and 456, respectively. The EO modulator 470 adjusts the intensity of the beam inputted from the third laser oscillator 511. Thereby, the angle of refraction of a beam (to be focused) supplied from the first laser oscillator 411 and inputted to the photorefractive crystal 446 is controlled. Therefore, the focusing position on the optical disk 447 is adjusted in the focusing direction. Further, on the basis of the tracking signal b, the actuator 542 moves the transmission pattern plate 543 in the direction indicated by the arrows to move the intensity distribution in the photorefractive crystal 446 in the parallel direction and hence the focusing position on the optical disk 447 in the tracking direction (vertical direction of FIG. 4). If the quantity of movement in the tracking direction is sufficiently small as compared with the beam diameter, the focusing deviation detection error and the tracking deviation detection error caused by the fact that the focus position deviation detection optical system is not moved but fixed can be neglected.

Another example of configuration of the radial polarization selecting means described before with reference to FIGS. 1 and 4 will now be described by referring to FIGS. 5A and 5B.

Figure 5A:
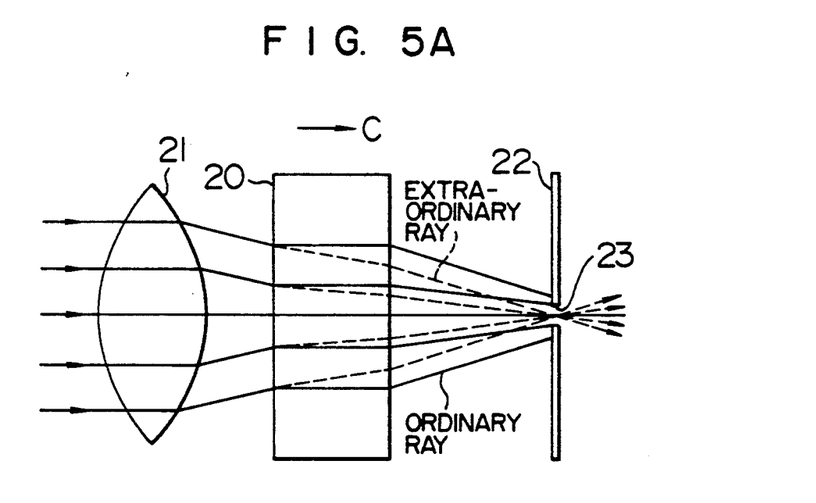
FIGS. 5A and 5B are enlarged views showing an embodiment of radial polarization selecting means.

In FIG. 5A, numeral 20 denotes a rutile crystal having the C-axis direction squared with the optical axis. Numeral 21 denotes an aspheric lens so configured as to focus the extraordinary ray onto the position of a pinhole 23 of a pinhole plate 22.

The operation will now be described.

A circularly polarized beam inputted to the aspheric lens 21 is refracted and passed through the rutile crystal 20. At this time, the circularly polarized beam is divided into an extraordinary ray and an ordinary ray. The extraordinary ray has a large angle of refraction and is focused to the pinhole 23 of the pinhole plate 22.

On the other hand, the ordinary ray has a small angle of refraction and is located at the outer side of the extraordinary ray. Therefore, only the extraordinary ray can be taken out from the pinhole plate 22.

In case only the normal ray is to be taken out, it can be done by disposing a screening plate 24 instead of the pinhole plate 22 and disposing a minute screen 25 at its central position.

Figure 5B:
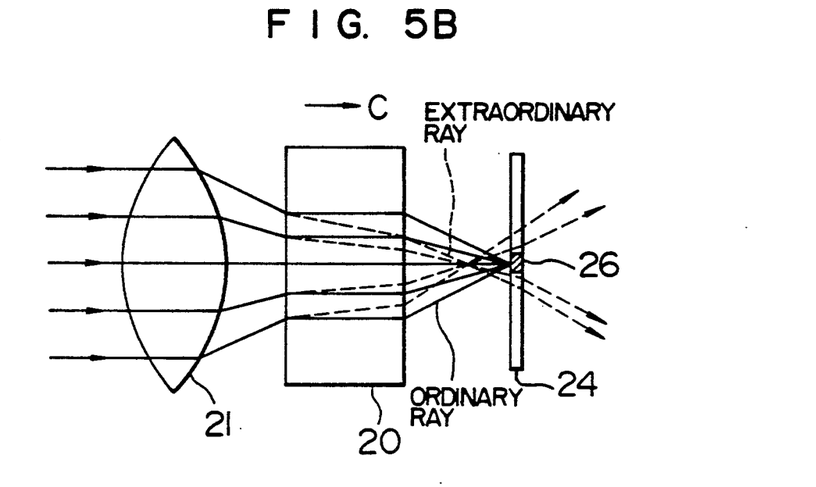

The degree of design freedom can be increased as compared with the embodiments of FIGS. 1 and 4 by using the configuration as shown in FIGS. 5A and 5B.

A different example of configuration of the focusing optical system (the aspheric lenses 145, 445 and photorefractive crystals 146, 446) shown in FIGS. 1 and 4 will now be described by referring to FIG. 8.

Figure 8:
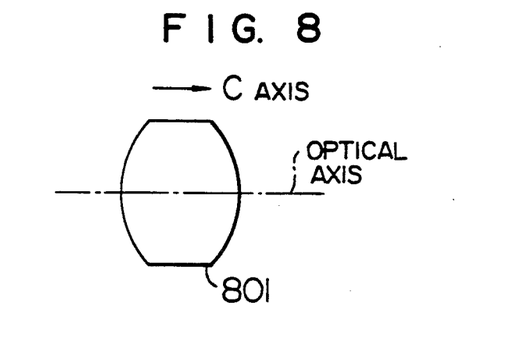
FIG. 8 is a configuration diagram of another focusing optical system according to the present invention.

With reference to FIG. 8, a photorefractive crystal 801 is configured in a lens form and has functions of both the aspheric lens and the photorefractive crystal of the embodiments shown in FIGS. 1 and 4. The lenseshaped photorefractive crystal 801 is located in such a position that the optical axis of the input beam coincides with the C axis. The face of this lenslike crystal can be shaped by using a ray tracing technique.

The focusing optical system of FIG. 8 has a merit that the configuration is simpler than that of FIG. 4.

Figure 6A:
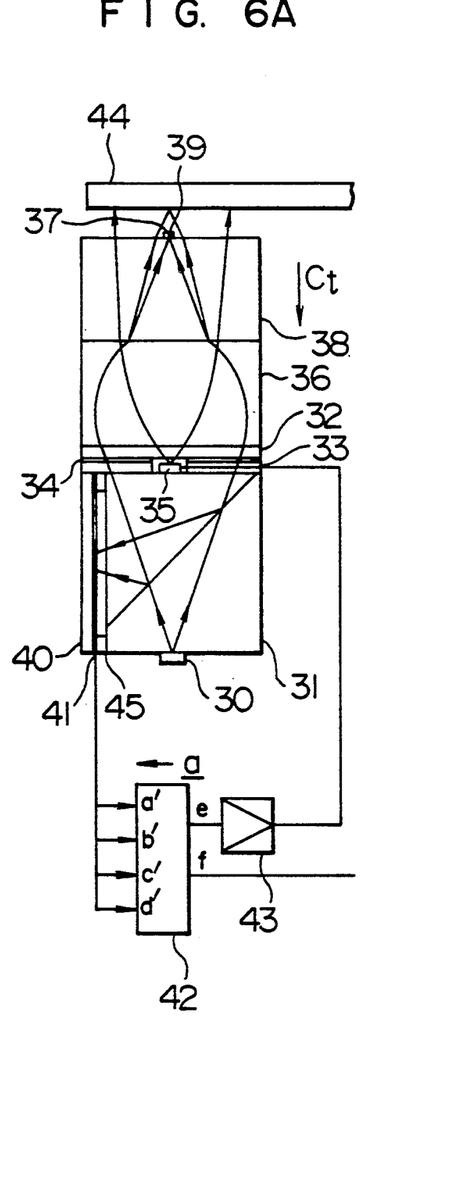
FIGS. 6A and 6B are configuration diagrams of an automatic focusing apparatus using an optical integrated circuit showing still another embodiment of the present invention.
Figure 6B:
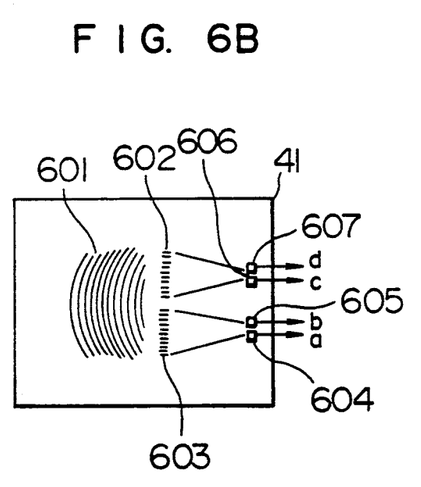

FIGS. 6A and 6B showing a focusing apparatus which is still another embodiment of the present invention will now be described. FIG. 6b shows an optical integrated circuit seen in the direction indicated by an arrow a of FIG. 6A.

With reference to FIGS. 6A and 6B, numeral 30 denotes a fourth semiconductor laser light source, 31 a polarizing beam splitter, and 32 a quarter wave plate. The polarizing beam splitter 31 is so attached to the quarter wave plate 32 via a spacer 33 that the slow axis (fast axis) of the quarter wave plate 32 may be located in the direction of 45° with respect to the paper plane. The above described spacer 33 has a transmission pattern 34 having nearly the same characteristics as those of the transmission pattern of FIG. 1. In a space formed by the above described spacer 33, a fifth semiconductor light source 35 is disposed. Numeral 36 denotes a grated index lens (hereinafter referred to as GRIN lens) which is a cylindrical lens having a distribution typically in the radial direction. Numeral 37 denotes a minute screening plate disposed on a photorefractive crystal 38. The minute screening plate 37 has a minute screening portion 39 in the central part thereof. Numeral 40 denotes a silicon substrate. On the upper face of the silicon substrate 40, an optical integrated circuit 41 is formed. Further, the above described polarizing beam splitter 31 is attached to the upper face of the optical integrated circuit 41 via a spacer 45. The above described optical integrated circuit 41 comprises a chirped grating (grating having uneven spacing) 601, grating beam splitters 602 and 603, and optical detectors 604, 605, 606 and 607. Numeral 42 denotes a focus position deviation detecting circuit, which outputs a focusing signal e and a tracking signal f on the basis of output signals a', b', c' and d' of the above described optical integrated circuit 41 (respectively outputted from optical detectors 604, 605, 606 and 607). Numeral 43 denotes a controller, which amplifiers the above described focusing e to control the output of the fifth semiconductor laser light source 35. Numeral 44 denotes an optical disk moved in the tracking direction, i.e., in the horizontal direction by drive means which is not illustrated. The above described drive means is driven and controlled on the basis of the tracking signal f supplied from the focus position deviation detecting circuit 42.

The operation will now be described.

A beam outputted from the fourth semiconductor laser light source 30 is converted into a circularly polarized beam having an intensity distribution as a result of its passage through the polarizing beam splitter 31, the transmission pattern plate 34 and the quarter wave plate 32. When the circularly polarized beam is focused by the GRIN lens 36 and inputted to the photorefractive crystal 38, the ordinary ray component of the input beam is screened by the minute screening section 39. Further, the extraordinary ray component is focused onto the optical disk 44 and then reflected. This reflected beam arrives again at the polarizing beam splitter 31 via the photorefractive crystal 38, the GRIN lens 36, the quarter wave plate 32 and the spacer 42 and it is then reflected and inputted to the optical integrated circuit 41. Herein, the reflected beam arrives at the optical detectors 604, 605, 606 and 607 via the chirped grating 601 and the grating beam splitters 602 and 603. On the basis of the output signals a', b', c' and d' respectively of the optical detectors 604, 605, 606 and 607, focus position deviations in the focusing direction and tracking direction are detected by the focus position deviation detecting circuit 42. The principle of detection in this case is already known as presented in "An Integrated-Optic Disk Pickup Device", Technical Report OQE 85-72, The Institute of Electronics and Communication Engineers of Japan, pp. 39-46 or JOURNAL OF LIGHTWAVE TECHNOLOGY, VOL. LT-4, NO. 7, JULY 1986, pp. 913-915, and hence it will not be further described. On the basis of the result of detection, the focus position deviation detecting circuit 42 then outputs the focusing signal $e=(a'+d')-(b'+c')$ and the tracking signal $f=(a'+b')-(c'+d')$. The controller 43 amplifies the above described focusing signal e and controls the output of the fifth semiconductor laser light source 35. Further, the above described tracking signal f is outputted to the optical disk drive means to control the position of the optical disk 44 in the tracking direction.

In the present embodiment, therefore, the overall configuration can be made more compact as compared with the embodiments described before. Since the overall components are incorporated as one body with the exception of the position deviation detecting portion and the optical disk, it is possible to easily position components each other, resulting in improved reliability.

With reference to the optical disk apparatus of the embodiment shown in FIG. 1, information reading has been described. As a matter of course, however, not only read operation but also write operation according to the present invention is possible. Although two laser oscillators are used as the light source, one laser oscillator may be used commonly by using half mirrors, for example. Further, although the light source for generating a predetermined refractive index in the photorefractive crystal and the light source of a control beam for controlling the focus position are implemented as a single common light source in the embodiment of FIG. 4, separate laser oscillators may be installed as respective light sources.

While particular embodiments of the present invention have been shown and described, it will be obvious to those skilled in the art that various changes and modifications may be made without departing from the present invention in its broader aspects.

I claim:

1. An automatic focusing apparatus comprising:
   a light source for outputting an optical beam to be focused;
   a focusing optical system for focusing the optical beam to be focused onto a focusing position by using a photorefractive crystal having a lens effect;
   a refractive-index distribution forming beam forming means for forming a refractive-index distribution forming beam having a predetermined intensity distribution and outputting the beam onto said photorefractive crystal to generate a lens effect in said photorefractive crystal;
   control beam outputting means for outputting a control beam onto said photorefractive crystal to control the lens effect caused by the refractive-index distribution generated in said photorefractive crystal; and
   means for controlling said control beam outputting means.

2. An automatic focusing apparatus according to claim 1, wherein said refractive-index distribution forming means includes a transmission device for providing a beam with a predetermined intensity distribution; and
said transmission device is adapted to transmit the beam to be focused supplied from said light source to provide said beam to be focused with the intensity distribution of said transmission device and form the refractive-index distribution forming beam.

3. An automatic focusing apparatus according to claim 1, wherein said photorefractive crystal of said focusing optical system is a uniaxial crystal and said photorefractive crystal is so disposed that the central axis thereof may coincide with the optical axis of said refractive-index distribution forming beam forming means.

4. An automatic focusing apparatus according to claim 1, wherein said focusing optical system comprises at least one focusing lens and a photorefractive crystal taking the shape of flat board.

5. An automatic focusing apparatus according to claim 1, wherein said focusing optical system comprises a photorefractive crystal formed to take the shape of a lens.

6. An automatic focusing apparatus according to claim 2, wherein the photorefractive crystal of said focusing optical system comprises barium titanate; and
said transmission device provides the transmitted beam with a intensity distribution expressed as $$T \approx \frac{\Delta n}{n_o n_e^2 r_{42}} \int_{r_\epsilon}^{r} \frac{1 - \left(\frac{r}{r_1}\right)^2}{\theta(r)} dr \bigg/ \left(I_o \exp\left(-2\left(\frac{r}{r_o}\right)^2\right)\right)$$

where
$n_3$ = refractive index (of photorefractive crystal) for extraordinary ray
$n_o$ = refractive index (of photorefractive crystal) for ordinary ray
$r$ = distance from optical axis
$r_1$ = positive constant
$r_\epsilon$ = positive constant (small)
$r_o$ = positive constant
$r_{42}$ = Pockels constant
$I_o$ = intensity of extraordinary ray at the optical axis
$\nu$ = angle formed by the direction of ray travel and C axis.

7. An automatic focusing apparatus according to claim 1, wherein said control beam outputting means is so configured as to output a beam having an intensity distribution different from that of said refractive-index distribution forming beam.

8. An automatic focusing apparatus according to claim 1, wherein said refractive-index distribution forming beam forming means has axisymmetrical polarization means comprising at least one lens, a beam separating optical member so disposed that the central axis, said beam separating optical member dividing a beam into an ordinary ray and an extraordinary ray by means of birefringence, and an interruption member so disposed in the focusing position of said ordinary ray as to interrupt the transmission of said ordinary ray.

9. An automatic focusing apparatus according to claim 1, wherein said refractive-index distribution forming beam forming means has axisymmetrical polarization means comprising at least one lens, a beam separating optical member so disposed that the central axis may coincide with the optical axis, said beam separating optical member dividing a beam into an ordinary ray and an extraordinary ray by means of birefringence, and a transmission member so disposed in the focusing position of said extraordinary ray as to transmit said extraordinary ray.

10. An automatic focusing apparatus according to claim 8, wherein in said axisymmetrical polarization means, said lens functions as said beam separating optical member as well.

11. An automatic focusing apparatus according to claim 8, wherein said beam separating optical member comprises a rutile crystal.

12. An automatic focusing apparatus according to claim 9, wherein said beam separating optical member comprises a rutile crystal.

13. An automatic focusing apparatus according to claim 1, wherein:
said control beam outputting means has means for adjusting the intensity of the output beam of said control beam outputting means; and
said control means comprises beam receiving means for receiving the beam to be focused reflected from said focusing position and detection means for detecting the deviation of the beam to be focused, and said control means detects a focusing deviation of the beam to be focused by using said detection means and supplies a control signal for controlling the focusing of the beam to be focused to said beam intensity adjusting means to control the output beam of said control beam outputting means.

14. An automatic focusing apparatus comprising:
a light source of a beam to be focused for outputting a linearly polarized coherent beam;
polarization means for converting the linearly polarized beam outputted from the light source to a circularly polarized beam;
means for separating an extraordinary ray and an ordinary ray from said circularly polarized beam and passing only the extraordinary beam;
a transmission device for transmitting a beam so as to provide a predetermined intensity distribution;
a focusing optical system for focusing the separated extraordinary ray onto a focusing position by using a focusing photorefractive crystal having a lens effect, said photorefractive crystal producing a lens effect caused by a refractive-index distribution according to the intensity distribution of an inputted beam to be focused and focusing the beam to be focused on the basis of said refractive index;
control beam outputting means including means for adjusting the intensity of an outputted beam, said control beam outputting means adjusting a control beam for controlling the lens effect caused by the refractive-index distribution generated in said photorefractive crystal by using said intensity adjusting means, said control beam outputting means outputting the control beam to said photorefractive crystal; and
control means including beam receiving means for receiving the focused beam reflected from said focusing position and detection means for detecting the deviation of the focused beam, said control means receiving the focused beam reflected from said focusing position by using said beam receiving means, detecting focusing deviation of the focused beam by using said detection means, supplying a control signal for controlling the focusing of the focused beam to said beam intensity adjusting means on the basis of the detected deviation, and controlling said control beam outputting means.

15. An automatic focusing apparatus according to claim 14, wherein:

said transmission device has moving means for supporting said transmission device and moving said transmission device in a direction perpendicular to the optical axis of an inputted beam; and the detection means of said control means further detects deviation of the focused beam in a horizontal direction on the basis of the focused beam reflected, and said control means supplies a control signal for adjusting the focused beam in the horizontal direction to the moving means of said transmission means on the basis of the detected deviation.

16. An automatic focusing apparatus according to claim 14, wherein:

said photorefractive crystal of the focusing optical system comprising barium titanate; and said transmission device provides the transmitted beam with an intensity distribution expressed as $$T \approx \frac{\Delta n}{n_o n_e^2 r_{42}} \int_{r_\epsilon}^{r} \frac{1-\left(\frac{r}{r_1}\right)^2}{\theta(r)} dr / \left( I_o \exp\left(-2\left(\frac{r}{r_o}\right)^2\right) \right)$$

where $n_e$ = refractive index (of photorefractive crystal) for extraordinary ray $n_o$ = refractive index (of photorefractive crystal) for ordinary ray $r$ = distance from optical axis $r_1$ = positive constant $r_\epsilon$ = positive constant (small)

$r_o$ = positive constant $r_{42}$ = Pockels constant $I_o$ = intensity of extraordinary ray at the optical axis $\theta$ = angle formed by the direct and C axis.

17. An automatic focusing apparatus comprising:

a light source of a beam to be focused for outputting a linearly polarized coherent beam;

polarization means for converting the linearly polarized beam outputted from the light source to a circularly polarized beam;

means for separating an extraordinary ray from said circularly polarized beam and passing only the extraordinary ray;

a focusing optical system for focusing the separated extraordinary ray onto a focusing position by using a photorefractive crystal having a lens effect;

means for forming a refractive-index distribution forming beam, said refractive-index distribution forming beam forming means including a transmission device for transmitting a beam so as to provide a predetermined intensity distribution, said refractive-index distribution forming beam forming means causing said transmission device to transmit a beam and form a refractive-index distribution forming beam having a predetermined intensity distribution and outputting said refractive-index distribution forming beam onto said photorefractive crystal to cause a lens effect in said photorefractive crystal;

control beam outputting means including means for adjusting the intensity of an outputted beam, said control beam outputting means adjusting a control beam for controlling the lens effect caused by the refractive-index distribution generated in the above described photorefractive crystal by using said beam intensity adjusting means, said control beam outputting means outputting the control beam to said photorefractive crystal; and control means including beam receiving means for receiving the focused beam reflected from said focusing position and detection means for detecting the deviation of the focused beam, said control means receiving the focused beam reflected from said focusing position by using said beam receiving means, detecting focusing deviation of the focused beam by using said detection means, supplying a control signal for controlling the focusing of the focused beam to said beam intensity adjusting means on the basis of the detected deviation, and controlling said control beam outputting means.

18. An automatic focusing apparatus according to claim 17, wherein:

said refractive-index distribution forming beam forming means has moving means for supporting said transmission device and moving said transmission device in a direction perpendicular to the optical axis of an inputted beam; and the detection means of said control means further detects deviation of the focused beam in a horizontal direction on the basis of the focused beam reflected, and said control means supplies a control signal for adjusting the focused beam in the horizontal direction to the moving means of said transmission means on the basis of the detected deviation.

19. An automatic focusing apparatus according to claim 17, wherein:

said photorefractive crystal of the focusing optical system comprises barium titanate; and said transmission device provided the transmitted beam with an intensity distribution expressed as $$T \approx \frac{\Delta n}{n_o n_e^2 r_{42}} \int_{r_\epsilon}^{r} \frac{1-\left(\frac{r}{r_1}\right)^2}{\theta(r)} dr / \left( I_o \exp\left(-2\left(\frac{r}{r_o}\right)^2\right) \right)$$

where $n_e$ = refractive index (of photorefractive crystal) for extraordinary ray $n_o$ = refractive index (of photorefractive crystal) for ordinary ray $r$ = distance from optical axis $r_1$ = positive constant $r_\epsilon$ = positive constant (small)

$r_o$ = positive constant $r_{42}$ = Pockels constant $I_o$ = intensity of extraordinary ray at the optical axis $\theta$ = angle formed by the direction of ray travel and C axis.

20. An automatic focusing apparatus comprising:

a polarizing beam splitter;

a grated index lens;

a photorefractive crystal;

first and second semiconductor laser light sources provided on the same optical axis respectively above and below said polarizing beam splitter;

an optical integrated circuit for detecting the deviation of focus position in the focusing direction and tracking direction on the basis of the reflected beam from the focused position in a direction perpendicular to said optical axis;

a spacer and a quarter wave plate provided around said second semiconductor laser light source and between said polarizing beam splitter and said grated index lens; and a minute screening means so disposed on the upper face of said photorefractive crystal as to face said focused position.

21. An automatic focusing method comprising the steps of:

outputting a beam to be focused from a light source;

focusing the beam to be focused onto a focusing position by using a photorefractive crystal having a lens effect;

outputting a refractive-index distribution forming beam having a predetermined intensity distribution to said photorefractive crystal and generating a lens effect in said photorefractive crystal;

outputting a control beam onto said photorefractive crystal to control the lens effect caused by the refractive-index distribution generated in said photorefractive crystal;

and controlling the intensity of said control beam and adjusting the focusing position of the beam to be focused.

22. An automatic focusing method comprising the steps of:

outputting a linearly polarized coherent beam from a light source for a beam to be focused;

converting the linearly polarized beam outputted from the light source to a circularly polarized beam;

separating an ordinary ray from said circular polarized beam and passing only the extraordinary ray;

focusing the separated extraordinary ray onto a focusing position by using a photorefractive crystal having a lens effect;

causing a transmission device for providing a predetermined intensity distribution to transmit a beam, thereby forming a refractive-index distribution forming beam having a predetermined intensity distribution, outputting said refractive-index distribution forming beam to said photorefractive crystal, and generating the lens effect in said photorefractive crystal;

adjusting a control beam for controlling the lens effect caused by the refractive-index distribution generated in said photorefractive crystal by using a device for adjusting the intensity of a beam to be outputted and outputting the control beam thus adjusted to said photorefractive crystal; and receiving the focused beam reflected from said focusing position, detecting focusing deviation of the focused beam, supplying a control signal to said beam intensity adjusting means so as to control the focusing of the focused beam on the basis of the detected deviation, and thereby controlling the intensity of said control beam.

23. An optical disk apparatus using an automatic focusing apparatus according to claim 1.

24. An optical disk apparatus using an automatic focusing apparatus according to claim 14.

* * * * *